Patented Nov. 22, 1949

2,489,122

UNITED STATES PATENT OFFICE 2,489,122

PREPARATION OF DINITROPARAFFINS

George S. Crandall, Woodbury, N. J., assignor to Socony-Vacuum Oil Company, Incorporated, a corporation of New York No Drawing. Application December 4, 1945, Serial No. 632,801

3 Claims. (Cl. 260—644)

This invention has to do with a new method for the preparation of gem-dinitroparaffins and, more particularly, has to do with a new method for the preparation of those gem-dinitroparaffins which are characterized by attachment of both nitro groups to a secondary carbon atom.

In the past, several attempts have been made to prepare gem-dinitroparaffins of the type represented by the following general formula:

I. 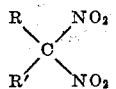

wherein R and R' may be the same or different alkyl groups. All previous attempts, however, have been occasioned by little success, inasmuch as the starting materials or reactants have been relatively expensive, the yields of the desired products have been small, etc., and, in general, all of such methods have proven uneconomical. For example, ter Meer (Liebig's Annalen der Chemie, 181, 1, (1876)) and Nef (ibid, 280, 263 (1894)) prepared secondary gem-dinitroparaffins by reaction of an alkyl halide with a silver salt of a primary gem-dinitroparaffin. J. Bredt (Berichte, 15, 2318 (1882)) reported that a small amount of 2,2-dinitropropane was obtained when isovaleric acid was nitrated at 0° C. The same dinitropropane was also prepared in rather small yields by Meyer and Locher (Annalen 180, 133 (1876)) by an oxidation method, chromic acid being added to oxidize propyl pseudonitrole in an acetic acid solution. The highest yield of the aforesaid dinitropropane obtained by Meyer and Locher was 35%; however they were not able to repeat this performance consistently. Meyer and Locher also reported that a small yield, 17%, of the same dinitropropane was obtained when propyl pseudonitrole was heated near its melting point.

We have now discovered an inexpensive method whereby substantial yields of secondary gem-dinitroparaffins are obtained. Specifically, the present method involves contacting a pseudonitrole at a temperature from about 25° C. below to about 10° C. above its decomposition temperature in the presence of a solvent which favors depolymerization of a pseudonitrole to its monomeric form and which does not react with decomposition products thereof.

The pseudonitroles contemplated herein for conversion to their corresponding gem-dinitroparaffins are represented by the general formula:

II. 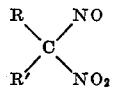

wherein R and R' may be the same or different alkyl groups and may be unsubstituted or substituted with such substituents as halogen, nitro, aryl, etc. While all of the pseudonitroles so defined are contemplated for use, propyl pseudonitrole, which is converted herein to 2,2-dinitropropane, is particularly preferred. The pseudonitriles may be prepared by any of the methods well known in the art. However, an inexpensive and preferred method is that which is described in Patent No. 2,370,185 issued on February 27, 1945, to E. M. Nygaard, J. H. McCracken and T. T. Noland.

The solvents used herein favor depolymerization of a pseudonitrole to its monomeric form and do not react with decomposition products thereof under the conditions of reaction. Typical solvents which have been found to be suitable are carbon tetrachloride, benzene, highly aromatic petroleum fractions, nitric acid, nitric acid and 2-nitropropane mixtures, dinitropropanes, etc. Particularly preferred of such solvents are carbon tetrachloride and nitric acid.

Reaction temperature is a fundamental consideration in the present process in that this condition should be maintained from about 25° C. below to about 10° C. above the decomposition temperature of the pseudonitrole reactant. For example, temperatures in the neighborhood of about 50° C. to about 85° C. are most desirable when propyl pseudonitrile is used in the present method.

In order to illustrate the present invention, a typical and preferred gem-dinitroparaffin-2,2-dinitropropane was prepared as described in detail in the following examples.

EXAMPLE I

Into a 250 cc. Erlenmeyer flask fitted with a reflux condenser were placed 25 parts by weight of 2-nitroso-2-nitropropane (propyl pseudonitrole) and about 160 parts by weight of carbon tetrachloride. These materials were then heated and the flask containing the same was agitated frequently. The solid propyl pseudonitrole dissolved slowly until the reflux temperature, about 77° C, was reached, whereupon all of the propyl pseudonitrole went into the solution forming a deep copper sulphate blue solution and accompanied by a fairly vigorous evolution of oxides of nitrogen. The rapid evolution of gases quickly subsided and decomposition proceeded smoothly with only small quantities of oxides of nitrogen being evolved. At the end of 15 minutes a colorless layer began to form over a lower layer which was characterized by the deep copper sulphate blue color. At the end of 30 minutes the lower layer had become green colored and the upper layer was still colorless. The entire product was distilled through a six plate column to a vapor temperature of 77° C. The products were acetone, about four parts by weight, and carbon tetrachloride. Water, 100 parts by weight, was now added to the residue and the distillation was continued. In addition to carbon tetrachloride which was the first material to distill, twelve parts by weight of 2,2-dinitropropane were obtained together with a small quantity of a yellow oil of unknown composition This corresponded to a yield of 42.3 per cent of 2,2-dinitropropane.

EXAMPLE II

Nitric acid, about 285 parts by weight of 70% acid, was placed in a 400 cc. beaker heated by means of a water bath. The nitric acid was stirred by means of a mechanical stirrer and was heated to a temperature of 45° C. Propyl pseudonitrole, about 60 parts by weight, was added in small quantities to the nitric acid at such a rate that the temperature of the mixture was maintained at 50 ± 3° C. Addition of the solid pseudonitrole was completed in 50 minutes and the mixture was stirred for about 42 minutes longer without further heating or cooling. The reaction product was poured on to 300 parts by weight of ice which was diluted with 200 parts by weight of water. The resultant mixture was then steam distilled whereupon 24 parts by weight of 2,2-dinitropropane were obtained. This corresponds to a yield of 35.9 per cent.

To further illustrate the method contemplated herein and to demonstrate the influence of reaction temperature, a number of examples, similar to Examples I and II above, are tabulated below in the table.

TABLE

*Conversion of propylpseudonitrole to 2,2-dinitropropane*

| Solvent | Reaction Temp. °C. | Yield Per cent |
|---|---|---|
| CCl₄ | 20-25 | 12.0 |
| CCl₄ | 70 | 32.0 |
| CCl₄ | 77 | 42.0 |
| CCl₄ | 85 | 27.5 |
| HNO₃ (70%) | 20 | 12.0 |
| HNO₃ | 50±3 | 35.9 |
| HNO₃ | 65-70 | 37.4 |
| HNO₃: 2-nitropropane mixture | 60 | 27.0 |
| 2,2-dinitropropane | 75-87 | 22.0 |

With respect to the influence of reaction temperature upon the present method, it will be clear from the foregoing tabulation that when carbon tetrachloride is used as a solvent, a yield of only 12 per cent is obtained with a reaction temperature of about 20-25° C.; however, with reaction temperatures of the order of about 70° C. and about 77° C., yields of 32.0 and 42.0, respectively, were realized. Similarly, when nitric acid is used as the solvent, a yield of 12.0 per cent is obtained with a reaction temperature of about 20° C. and yields of the order of 35.9-37.4 per cent are obtained with reaction temperatures of the order of 50° C. to about 70° C.

It will be apparent from the foregoing illustrative examples that the present method is a valuable means for preparing secondary gem-dinitroparaffins. As is well known to those familiar with the chemical art, such compounds are valuable intermediates in chemical synthesis; and recently these compounds have been found to be extremely effective ignition improvers for Diesel type fuels.

Although the present invention has been illustrated hereinabove by the preparation of a specific secondary gem-dinitroparaffin and has been illustrated by specific procedures, it is to be understood that these are but preferred embodiments of this new method for the preparation of secondary gem-dinitroparaffins. The present invention, however, is not to be construed as limited thereto, but is to be broadly construed in the light of the defining language of the appended claims.

I claim:

1. The method of preparation of a dinitroparaffin having the general formula:

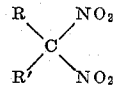

wherein R and R' are alkyl radicals, which consists of contacting an alkyl pseudonitrole at a temperature from about 25° C. below to about 10° C. above its decomposition temperature with carbon tetrachloride, said pseudonitrole having the general formula:

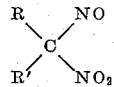

wherein R and R' are as defined above.

2. The method of preparation of 2,2-dinitropropane which consists of contacting propyl pseudonitrole at a temperature from about 50° C. to about 85° C. with carbon tetrachloride, and separating 2,2-dinitropropane from the reaction mixture obtained in the preceding operation.

3. The method of preparation of a dinitroparaffin having the general formula:

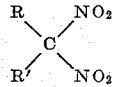

wherein R and R' are alkyl radicals, which consists of contacting an alkyl pseudonitrole at a temperature from about 25° C. below to about 10° C. above its decomposition temperature with an organic solvent selected from the group consisting of carbon tetrachloride, benzene and a highly aromatic petroleum fraction, said pseudonitrole having the general formula:

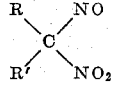

wherein R and R' are as defined above.

GEORGE S. CRANDALL.

REFERENCES CITED

The following references are of record in the file of this patent:

Meyer et al.: "Liebig's Annalen," vol. 180 (1875), pages 144, 147, 148.

Born: "Berichte Deutsche Chem. Gesell.," vol. 29 (1896), pages 93 to 101.